United States Patent [19]

Hatada et al.

[11] Patent Number: 4,732,814
[45] Date of Patent: Mar. 22, 1988

[54] POLYESTER FILM WITH SMOOTH AND HIGHLY ADHESIVE SURFACE AND METHOD OF MAKING SAME

[75] Inventors: Kenji Hatada, Kurita; Ken-ichi Kawakami, Abiko; Hiroaki Kobayashi, Otsu, all of Japan

[73] Assignee: Toray Industries, Inc., Tokyo, Japan

[21] Appl. No.: 783,208

[22] Filed: Oct. 2, 1985

[51] Int. Cl.$^4$ .............................. G11B 5/70
[52] U.S. Cl. .................. 428/480; 428/141; 428/143; 428/694; 428/900; 428/910
[58] Field of Search ............. 428/143, 480, 694, 900, 428/141, 910; 427/128

[56] References Cited

U.S. PATENT DOCUMENTS

| | | | |
|---|---|---|---|
| 4,072,769 | 2/1978 | Lidel | 427/38 |
| 4,233,352 | 11/1980 | Ohno et al. | 428/427 |
| 4,505,966 | 3/1985 | Adachi et al. | 428/141 |
| 4,514,451 | 4/1985 | Suzuki et al. | 428/141 |
| 4,568,600 | 4/1986 | Ono et al. | 428/694 |
| 4,590,119 | 5/1986 | Kawakami et al. | 428/480 |

FOREIGN PATENT DOCUMENTS 0090499 10/1983 European Pat. Off. .
0132951 2/1985 European Pat. Off. .

OTHER PUBLICATIONS

Chemical Abstracts, vol. 98, No. 14, 4 Apr. 1983, Abstract No. 108018z, Su, A 919330 (P. Valetski et al.), 23 Nov. 1982.

Primary Examiner—Paul J. Thibodeau
Attorney, Agent, or Firm—Austin R. Miller

[57] ABSTRACT

Disclosed is a biaxially stretched polyester film having a modified surface with an excellent bondability, in which both the surface smoothness and the slip characteristic, which are contradictory to each other, are satisfactory. This biaxially stretched polyester film has a multiplicity of ultra-fine protrusions which are an integral part of the film and dyeable with osmic acid. The film is prepared by subjecting an undrawn or drawn polyester sheet to a plasma treatment and then drawing the treated sheet at least once. The film is valuable as a base for a magnetic recording medium.

12 Claims, 8 Drawing Figures

POLYESTER FILM WITH SMOOTH AND HIGHLY ADHESIVE SURFACE AND METHOD OF MAKING SAME

BACKGROUND OF THE INVENTION

(1) Field of the Invention

The present invention relates to a polymeric resin film that is used as an information recording medium such as a magnetic tape or silver salt photographic film, an electric part such as a capacitor, a graphic art article or a packaging material, especially a polymeric resin film having improved surface characteristics, and a process for preparing this polymeric resin film.

(2) Description of the Related Art

A biaxially stretched polyester film is broadly used as a base film of a magnetic tape, a floppy disc, a photorecording medium or a silver salt photographic film.

In the field of recording media, an increase of the recording density is desired, and therefore, improvements of surface characteristics of a polymeric resin film as the base are strongly desired. For example, in a film type magnetic recording medium such as a high-density recording medium of a magnetic tape or magnetic disc, the loss at the time of recording or reproduction, which is due to the spacing loss between the recording medium and the magnetic head, is very serious. Therefore, it is eagerly desired that the surface is made smoother to reduce the spacing loss. Namely, it is required that the surface of the polymeric film as the base should be smooth. This also is desired in the field of photorecording media.

If the surface of a polymeric film is smoothened, the slip characteristic of the polymer film is degraded, and a serious problem arises in that running of the polymeric film becomes difficult in the polymeric film-preparing process or the recording layer-forming process. In short, the surface smoothness is contradictory to the easy slip characteristic in a polymeric film. However, in a polymeric film as a base of an information-recording medium, it is eagerly desired that both the requirements of surface smoothness and an easy slip characteristic will be simultaneously satisfied.

Furthermore, since it is desired that the durability of a polymeric film as an information-recording medium will be improved, it is required that the adhesion between the polymeric film and recording layer should be improved and the easy bondability of the polymeric film should be increased.

Various attempts have been made to satisfy these requirements. For example, incorporation of fine particles of calcium carbonate or silicon oxide into a polymer is generally adopted. However, according to this method, projections formed on the surface by the fine particles are too large. Accordingly, a method in which the particles to be incorporated are made much finer and these particles are homogeneously incorporated into a polymer is now under vigorous examination. However, presently available films having ultra-fine particles incorporated therein have an insufficient slip characteristic, although the surface smoothness is improved.

As means quite different from the method of incorporating such fine particles, Japanese Unexamined Patent Publication (Kokai) No. 59-35920 proposes a method in which an undrawn sheet is subjected to the corona discharge treatment in the open air and the sheet is then drawn to improve the slip characteristic. As the result of experiments made by us, it was found that the effect is insufficient and the requirements are not practically satisfied, and that no substantial improvement of the easy bondability can be attained. U.S. Pat. No. 3,489,117 discloses a technique of improving the slip characteristic of a polymer film by coating a polyester film with a resin comprising a water-soluble polymer and a silane coupling agent and drawing the coated polyester film to form a discontinuous covering film having a net-like shape and/or a node-broken net-like shape on the film surface. However, since the discontinuous covering film formed on the film surface does not have a uniform thickness and shape, the surface uniformity and easy slip characteristic are still insufficient. Moreover, since the discontinuous covering film and the base film are composed of different resins, the adhesion between the base film and the covering film is poor and a substantial improvement of the bondability cannot be attained.

As means for improving the bondability, there is generally known a method in which the corona discharge treatment is carried out in the open air, as disclosed in, for example, U.S. Pat. No. 3,018,189 and U.S. Pat. No. 1,252,935. According to this method, however, the improving effect is insufficient and the attained effect disappears in a short time.

U.S. Pat. No. 4,072,769 discloses a method in which a polyethylene terephthalate film is subjected to the plasma treatment in the presence of NO gas or $NO_2$ gas to enhance the easy bondability. The initial improving effect by the plasma treatment is higher than that attained by the corona discharge treatment, but as in the case of the corona discharge treatment, the effect by the plasma treatment is degraded with the lapse of time. Moreover, this plasma treatment is costly.

SUMMARY OF THE INVENTION

It is a primary object of the present invention to provide a biaxially stretched polyester film which is smooth and has an easy slip characteristic and easy bondability, and has improved surface characteristics which are not degraded with the lapse of time.

In one aspect of the present invention, there is provided a biaxially stretched polyester film having a multiplicity of ultra-fine protrusions on the surface. The protrusions have a height of 50 to 300 angstroms, a width of 100 to 3000 angstroms as observed on the cross-section parallel to the direction of the arrangement of the protrusions, and 1 to 20 protrusions are present per $\mu m$ of the surface length. The protrusions are characterized as being an integral part of the polyester film and being dyeable with osmic acid.

In another aspect of the present invention, there is provided a process for the preparation of the above-mentioned biaxially stretched polyester film, which comprises subjecting an undrawn or drawn polyester sheet to a plasma treatment and drawing the treated sheet at least once.

DESCRIPTION OF THE PREFERRED EMBODIMENTS

The present invention provides a biaxially stretched polyester film having on the surface thereof a multiplicity of ultra-fine protrusions dyeable with osmic acid, which have an excellent smoothness and easy slip characteristic, are contradictory to each other, and have an easy bondability not degraded with the lapse of time.

The biaxially stretched polyester film is a biaxially stretched film of a polyester polymer having the above-mentioned surface at least in a part of the surface thereof.

The polyester polymer is a polyester polymer derived from an aromatic dicarboxylic acid as the main acid component and an alkylene glycol as the main glycol component. More specifically, there can be mentioned polyester polymers derived from an aromatic dicarboxylic acid such as terephthalic acid, isophthalic acid, naphthalene-dicarboxylic acid, diphenyl dicarboxylic acid, diphenyl ether dicarboxylic acid, diphenylketone dicarboxylic acid, dephenylsulfone dicarboxylic acid, diphenylether dicarboxylic acid, $\alpha,\beta$-bis(2-chlorophenoxy)ethane-4,4'-dicarboxylic acid anthracene-dicarboxylic acid or the like as the acid component, and an alkylene glycol such as ethylene glycol, trimethylene glycol, tetramethylene glycol, pentamethylene glycol, hexamethylene glycol hexylene glycol or the like as the glycol component. A polyethylene terephthalate polymer derived from terephthalic acid and ehtylene glycol is especially preferred as the polyester polymer.

Inorganic or organic fine particles may be incorporated in the polyester polymer, so far as the surface smoothness is not degraded. For example, very fine colloidal silica particles may be added in a small amount. In this case, however, care should be taken so that secondary agglomeration of the fine particles is not caused.

The polyester may of course contain known additives, for example antistatic agent, heat stabilizer, ultraviolet absorber or the like, in an amount without impairing the advantages of the invention.

The biaxially stretched polyester film of the present invention is characterized in that ultra-fine protrusions dyeable with osmic acid are present at least on a part of the surface of the film. If these protrusions are present on the surface, an easy slip characteristic and easy bondability are manifested, although the reason therefor has not been elucidated.

Figure 1A:
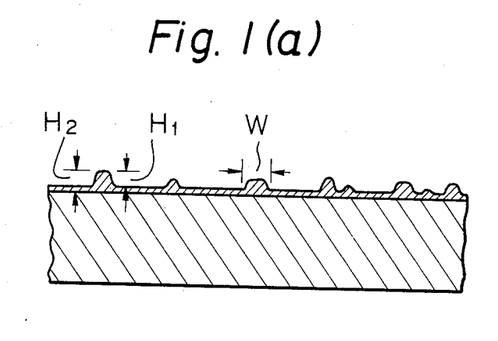
FIG. 1 is a view showing a cross-section of a biaxially stretched polyester film of the present invention, wherein a hatched surface portion is an osmic acid-dyeable portion and marks "●" in (c) indicate ultra-fine particles contained in the film.
Figure 1B:
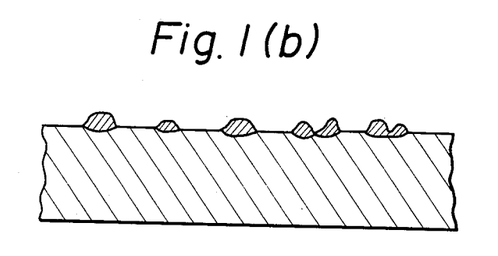
Figure 1C:
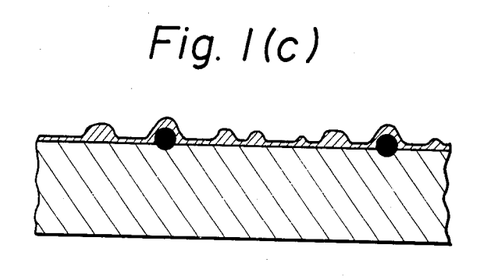

The biaxially stretched polyester film of the present invention can be identified by observing the film surface by a field emission scanning electron microscope and by dyeing an ultra-fine slice of the surface layer portion of the film and observing the section of the dyed slice by a transmission electron microscope. FIGS. 1-(a), 1-(b), and 1-(c) are enlarged model diagrams showing the cross-section of the biaxially stretched polyester film of the present invention. The hatched surface portion is a portion dyeable with osmic acid. In the film shown in FIG. 1-(a), the surface layer as well as the protrusions is dyeable with osmic dye, and in the film shown in FIG. 1-(b), substantially the protrusions alone are dyeable with osmic acid. These films can be optionally formed by changing the preparation conditions according to the required properties. FIG. 1-(c) is an enlarged model diagram illustrating a film containing fine particles which are indicated by marks "●" If fine particles only are incorporated, the projections are small and the easy slip characteristic cannot be manifested, but if protrusions as shown in the drawings, which are dyeable with osmic acid, are formed, the easy slip characteristic is surprisingly enhanced even though the height of the protrusions is smaller than the height of projections formed by the fine particles. Note, FIG. 1 is a model diagram, and it should be particularly noted that FIG. 1 does not precisely reproduce the film of the present invention.

In the drawings, $H_2$ represents the thickness of the osmic acid-dyeable surface portion. It is preferred that the thickness of the osmic acid-dyeable surface portion be 30 to 500 angstroms. If the thickness of the osmic acid-dyeable surface portion is smaller than 30 angstroms, both the easy slip characteristic and the bondability are not satisfactory. If the thickness of the osmic acid-dyeable surface portion exceeds 500 angstroms, the surface smoothness is degraded, the cohesive force between the osmic acid-dyeable surface portion and the base becomes poor, and the bonding force is substantially reduced.

Figure 2:
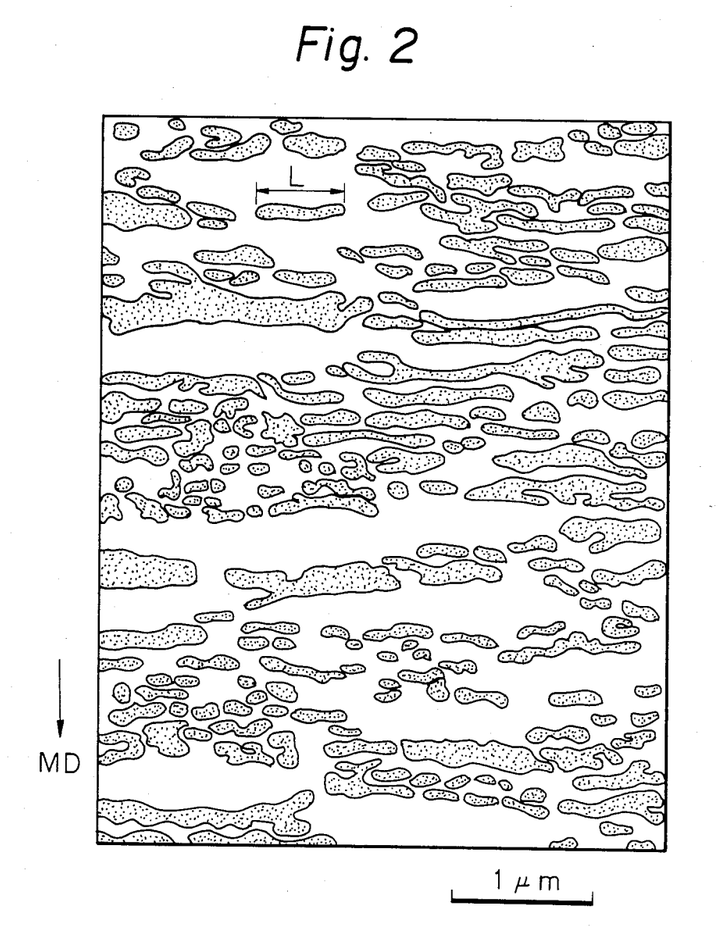
FIG. 2 is a model diagram of the surface of a film of the present invention observed by an electron microscope, in which a dotted portion is a protrusion dyeable with osmic acid, L represents the length of the protrusion, and MD represents the longitudinal direction of the film.

FIG. 2 is a model diagram of the surface of the film of the present invention, in which the dotted portions represent protrusions dyeable with osmic acid.

Figure 3:
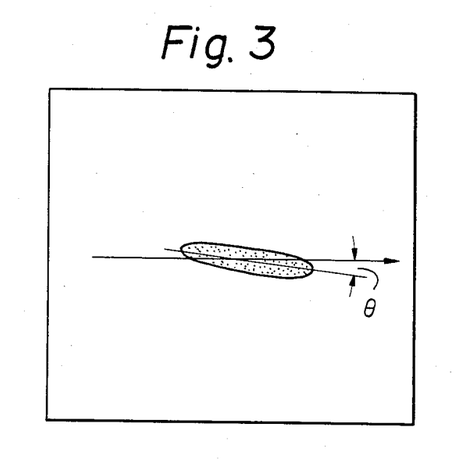
FIG. 3 is a diagram illustrating the method for determining the direction and angle of the arrangement of protrusion, wherein MD and TD indicate the longitudinal direction of the film and the lateral direction thereof, respectively.

In the film of the present invention, it is preferred that osmic acid-dyeable protrusions be substantially uniformly arranged in a certain direction, as shown in FIG. 2. If more than 50% by number of the formed protrusions are arranged in a certain direction, the easy slip characteristic is further improved. In view of the improvement of the easy slip characteristic, it is preferred that the protrusions be arranged in the longitudinal or lateral direction of the film, especially in the lateral direction. The arrangement in the longitudinal or lateral direction referred to herein means that the angle ($\theta$) of the major axis of the protrusions to the longitudinal direction (MD) or lateral direction (TD) of the film, as shown in FIG. 3, is within $\pm 30°$, preferably within $\pm 15°$. The TD or MD is shown by an arrow in FIG. 3.

In the film of the present invention, the smoothness and easy slip characteristic depend on the size of the protrusions on the film surface. In the film of the present invention, when the cross section in perpendicular to the direction of the arrangement of the protrusions is observed, the height of the osmic acid-dyeable protrusions is 50 to 300 angstroms, the width of the osmic acid-dyeable protrusions is 100 to 3000 angstroms and the number of the protrusions present per $\mu m$ is 1 to 20. If the height of the protrusions is smaller than 50 angstroms or the number per $\mu m$ is smaller than 1, the easy slip characteristic is poor. If the height is larger than 300 angstroms and the number per $\mu m$ is larger than 20, the surface smoothness is degraded and no bondability is attained.

The size of the protrusions is defined by the height $H_1$ and width W of the cross section shown in FIG. 1, which is obtained by cutting the film shown in FIG. 2 in paralled to the MD direction.

It is preferred that when the film is observed from the surface, the size of the protrusions be such that the width and height are within the above-mentioned ranges and the number of osmic acid-dyable protrusions having a length of 100 angstroms to 2 $\mu m$ is 10 to 50 per $\mu m^2$ of the film surface. The length referred to herein means the length of the protrusion in the major axis, that is, the length L shown in FIG. 2.

The size of the osmic acid-dyeable protrusions formed on the surface of the film of the present invention is not limited to the above-mentioned size. It is sufficient if the area occupied by the protrusions having the above-mentioned size is at least 50% of the total area occupied by the protrusions.

The surface roughness ($R_a$) of the film of this invention is in the range of 0.0005 to 0.0100 $\mu m$. Preferably, the range is 0.001 to 0.0050 $\mu m$. When the surface roughness $R_a$ is less than 0.0005 $\mu m$, the film surface is too flat and easily scratched. On the other hand, the flatness tends to be impaired with $R_a$ of more than 0.0100 $\mu m$. It will be difficult to obtain a magnetic tape having both good electromagnetic conversion and running properties from a film of which $R_a$ lies outside the above-mentioned preferable range.

The static friction coefficient of the film ($\mu_s$) of this invention is desirably in the range of 0.3 to 3. Preferably, the range is 0.4 to 2.5, and more preferably 0.5 to 2.0. When the static friction coefficient $\mu_s$ is less than 0.3, side slip winding tends to occur during operation procedures. On the other hand, the slipperiness may often be insufficient and high speed film runability tends to deteriorate during processing courses with $\mu_s$ being more than 3.

The substance of the osmic acid-dyeable ultra-fine protrusion formed on the surface of the film of the present invention is not particularly critical, but, in view of the bondability, the protrusions should be an integral part of the film. It is preferred that the osmic acid-dyeable substance be one formed by the surface modification of the base film. The bondability of the film should be naturally improved by this surface modification. Furthermore, if the film surface is modified, the slip characteristic between films is ordinarily improved. In the film of the present invention, not only these improving effects owing to the chemical composition change but also an effect of highly improving the easy slip characteristic by formation of the protrusions on the surface can be attained.

In the biaxially stretched polyester of the present invention having the surface having osmic acid-dyeable protrusions formed by the surface modification (hereinafter referred to as "modified surface"), the infrared absorption spectrum of the modified surface measured by the ATR method according to the Fourier Transform Infrared Spectrometry is not substantially different from the infrared absorption spectrum of the surface left after cutting off the modified surface, that is, the polyester polymer as the base. By the ordinary measurement using an X-ray photoelectron spectroscopic analysis device (hereinafter referred to as "ESCA"), slight changes can be observed in the integration intensities of respective peaks in the modified surface, but a new peak not observed in the polyester polymer as the base is not found at all.

In case of a film surface which has been subjected to an ordinary surface modification or a surface formed by coating a different resin on the surface of a film, clear differences are observed between this surface and the polyester polymer as the base according to the above-mentioned infrared spectrometry or ESCA measurement.

The significant difference between the modified surface and th base polyester polymer in the biaxially stretched polyester film of the present invention can be detected by measuring only the surface layer by ESCA so that the photoelectron emission angle is 20° C.

According to the above-mentioned method, in the biaxially stretched polyester film of the present invention, the ratio ($O_{1s}/C_{1s}$) of the integration intensity $O_{1s}$ of the peak of the oxygen atom to the integration intensity $C_{1s}$ of the peak of the carbon atom in the modified surface is controlled preferably to 50 to 95%, more preferably 70 to 90%, of the $O_{1s}/C_{1s}$ ratio in the non-modified surface (i.e. the surface of the polyester polymer as the base). If the ratio $O_{1s}/C_{1s}$ is smaller than 50%, the surface smoothness of the film is poor and the cohesive force between the modified layer and the polyester polymer as the base is reduced, resulting in reduction of the bondability. If this ratio exceeds 95%, the effects of improving the easy slip characteristic and the bondability cannot be obtained.

Ordinarily, the ratio $O_{1s}/C_{1s}$ of the modified surface is larger than the ratios $O_{1s}/C_{1s}$ of the nonmodified surface. On the other hand, in the biaxially stretched polyester film of the present invention, this ratio is reduced by the surface modification. This is considered to be one cause of the improvement of the resistance against reduction of the bondability with the lapse of time.

Ordinarily, when any surface treatment is carried out, the contact angle to water is greatly changed. However, the contact angle of the biaxially stretched polyester film of the present invention is different from that of the untreated film only within 10°. It is considered that this also is a cause of an increase of the resistance against reduction of the easy bondability with the lapse of time.

Although the surface of the biaxially stretched polyester film of the present invention is smooth, the film has good easy slip characteristic and bondability. Accordingly, a magnetic recording medium formed by using this polyester film as the base film has excellent magnetic characteristics. By the magnetic recording medium referred to herein is meant a product formed by laminating a magnetic layer on the biaxially stretched polyester film of the present invention. The magnetic material used for the magnetic layer is not particularly critical, and iron, iron oxide, iron oxide doped with Co, $CrO_2$, am Fe-Co alloy, a Co-Ni alloy and ferromagnetic alloys can be used. The magnetic layer can be formed by mixing the magnetic material with a binder and coating the mixture on the polyester film or by vacuum-depositing the magnetic material on the polyester film. Furthermore, an intermediate layer may be formed between the film and the magnetic layer, a lubricating layer may be formed on the magentic layer, or a back-coat layer may be formed on the back surface of the film.

Recently, a film type magnetic recording medium having a magnetic layer formed by vacuum deposition has attracted attention as a recording medium showing a high recording density. In the case of a film type magnetic recording medium, the surface condition of the base film is manifested on the surface of the magnetic layer and is an important factor having an influence on the spacing loss to the recording or reproducing and determining the characteristics of the magnetic recording medium. In the magnetic recording medium of the present invention, since fine protrusions are reproduced on the surface of the magnetic recording layer from the surface of the base film, the running property is improved and the spacing loss is reduced. It is preferred that at least 50% by number of the protrusions be arranged so that the longitudinal directions thereof are within ±15° relatively to the longitudinal or lateral direction of the magnetic recording medium, especially to the lateral direction in the case of a magnetic tape.

When the cross-section of the film in perpendicular to the arrangement direction of the protrusions is observed, the height of the protrusions is 50 to 300 angstroms, the width of the protrusions is 100 to 3000 angstroms, and the number of p rotrusions present $\mu$m of the longitudinal direction is 1 to 20. If the height is smaller than 50 angstroms and the number is smaller than 1, the running property of the magnetic recording medium is poor. If the height exceeds 300 angstroms and the number is larger than 20, the spacing loss is increased and the electro-magnetic conversion characteristic is degraded.

When the magnetic recording medium is observed from the surface, it is preferred that at least 50% by number of the protrusions have a length of 100 angstroms to 2 $\mu$m and that 10 to 50 of the protrusions are present per $\mu$m$^2$. If the length exceeds 2 $\mu$m and the number is smaller than 10, the running property of the magnetic recording medium is poor. If the length is smaller than 100 angstroms and the number exceeds 50, the surface roughness is increased and dropout is caused when reproducing the recorded information.

Figure 4A:
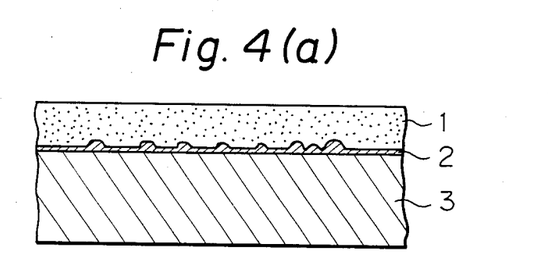
FIG. 4 is a sectional view illustrating the structure of a magnetic recording medium of the present invention, in which in (a), reference numerals 1, 2, and 3 represent a coating type magnetic layer, a surface layer composed of a biaxially stretched polyester film of the present invention, and a basic polymer layer, respectively, and in (b), reference numeral 1 represents a magnetic layer of the vacuum deposition type and reference numerals 2 and 3 represent the same layers as in (a)
Figure 4B:
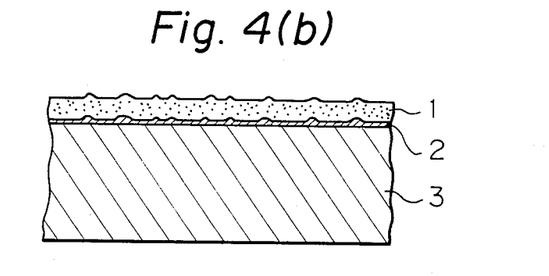

FIG. 4-(a) is a model diagram showing a cross-section of an example of the coating type magnetic recording medium according to the present invention. FIG. 4-(b) is a model diagram showing a cross-section of an example of the vacuum deposition type magnetic recording medium according to the present invention. In the drawings, the hatched portion 2 and dotted portion 1 represent a modified surface layer and a magnetic layer, respectively. In these model diagrams, the respective thicknesses are not absolutely precise and a lubricating layer and backcoat layer are omitted.

The process for preparing the biaxially stretched polyester film of the present invention is not particularly critical, but a process comprising subjecting a non-stretched or incompletely stretched polyester sheet to a plasma treatment and then drawing the sheet in at least one direction to complete the bioxial drawing is preferred.

By the term "sheet" used herein is meant a long, broad and thick sheet-like product obtained by shaping a polymeric resin by the melt extrusion method, the solution casting method or the calender method and optionally drawing the formed undrawn sheet. A crystalline polymeric resin is oriented and crystallized by the drawing and the crystallization degree is increased. A sheet of a crystalline polymeric resin can be drawn to a film having improved the mechanical characteristics.

The plasma treatment comprises exposing the sheet to discharge caused and maintained by imposing a high voltage in a low pressure gas atmosphere, that is, so-called glow discharge, and treating the sheet with activated particles of electrons, ions, excited atoms, excited molecules, radicals, and ultraviolet rays formed during this glow discharge.

The gas pressure employed in the plasma treatment is preferably from $1 \times 10^{-3}$ Torr to 50 Torr. If the gas pressure is lower than $1 \times 10^{-3}$, the surface of the sheet is discolored and the surface layer is deteriorated, and the bonding property is degraded. If the gas pressure is higher than 50 Torr, no substantial plasma treatment effect can be attained. It is preferred that the gas pressure be $5 \times 10^{-3}$ to 0.5 Torr, because the plasma treatment effect is highest if the gas pressure is within this range.

The frequency of the high voltage to be imposed to cause and maintain discharging is not particularly critical, and a direct current, a low frequency, a high frequency, and micro-waves can be used. A high frequency of 50 to 500 KHz is especially preferred because this provides the best surface characteristic improving effect.

The apparatus used for the plasma treatment, especially the electrode shape or electrode arrangement, is not particularly critical. Since a broad and long sheet composed of a polymeric resin is treated, it is preferred that an apparatus having asymmetric electrodes, as disclosed in Japanese Unexamined Patent Publication No. 52-147593, be used.

From the industrial viewpoint, it is preferred that the plasma treatment be carried out according to the so-called air-to-air system, in which a sheet is continuously introuduced into a plasma maintained at a reduced pressure from the open air, subjected to the plasma treatment, and discharged into the open air. It is more preferred that a film be prepared by continuously performing the shaping of a polymeric resin, the treatment, and the drawing successively.

If the film is not prepared in this continuous and successive manner, that is, if the sheet if once wound and then subjected to the plasma treatment or the sheet is wound after the plasma treatment and is then drawn, since the sheet does not slip, the sheet surfaces will be damaged by frictional contact between the sheets and the surface smoothness will be deteriorated. Accordingly, in order to obtain a film having a smooth surface and a good slip characteristic, it is preferred that the film be prepared in the above-mentioned continuous and successive manner.

An inorganic gas, an organic compound vapor or a mixture thereof may be appropriately used for the plasma treatment according to the required properties of the film.

The kind of the inorganic gas used in the present invention is not particularly critical. For example, there can be mantioned $H_2$, $He$, $Ne$, $Ar$, $Kr$, $Xe$, $N_2$, air, $H_2O$, $N_2O$, $NO$, $N_2O_4$, $N_2O_3$, $CO$, $CO_2$, $NH_3$, $SO_2$, $Cl_2$, Freon gas such as CF$_4$, and mixtures thereof. An appropriate gas may be selected according to the required properties of the film. Among these gases, He, Ar, N$_2$, CO, CO$_2$, N$_2$O, air or a mixture of two or more of them is preferred, because the various desirable surface characteristics can be manifested stably.

If O$_2$, O$_3$ or a gas containing O$_2$ or O$_3$ in a large quantity is used, the bondability is reduced by the heat treatment conducted for converting the sheet to a film or the easy slip effect cannot be attained, and certain surface characteristics are not improved. Accordingly, if improvement of these characteristics is desired, it is preferred that the incorporation ratio of O$_2$ or O$_3$ into the gas be as low as possible, for example, lower than 50 mole%, especially lower than 30 mole%.

The kind of the organic compound vapor used in the present invention is not particularly critical, but, preferably, will be an organic compound having an appropriate vapor pressure at the temperature of the atmosphere used and capable of manifesting the required properties of the film. For example, there can be mentioned ordinary organic solvents such as methyl alcohol, ethyl alcohol, xylene, and toluene; unsaturated monomers such as ethylene, acetylene, vinyl chloride, styrene, allyl alcohol, acrylic acid, methacrylic acid, acrylic acid esters, and methacrylic acid esters; silane compounds such as vinylsilane, trimethylmethylmethoxysilane, trimethylchlorosilane, hexamethylsilazane, and $\gamma$-(2-aminoethyl)aminopropyltrimethoxysilane; and fluorine compounds such as tetrafluoroethylene, hexafluoropropylene, and monochlorotrifluoroethylene. Note, the organic compounds that can be used in the present invention are not limited to those exemplified above.

The gas to be used for the plasma treatment in the present invention is appropriately selected according to the required surface characteristics of the film. However, when an organic compound vapor or a mixture thereof with an inorganic gas is used, the surface smoothness is often deteriorated or the film is made opaque by the drawing conducted after the low temperature plasma treatment, or the $O_{1s}/S_{1s}$ ratio is outside the above range and the bondability is reduced. Accordingly, in order to manifest the required surface characteristics of the film, it is preferred that an inorganic gas be used.

The process for preparing the polymeric resin film of the present invention will now be described in detail.

A polyester resin is formed into a sheet according to a method suitable for the polyester resin. For example, polyethylene terephthalate is melt-extruded at 270° C. to 300° C. and cast on a cooling drum maintained at a temperature below 80° C. to obtain an undrawn sheet.

The sheet is then subjected to the plasma treatment as it is or after drawing. The drawing method before the plasma treatment is not particularly critical. Any drawing method can be adopted, in so far as such a method makes it easy to impart the required surface characteristics to the film.

The formed sheet is subjected to the plasma treatment either before drawing or after incomplete drawing while taking the required properties of the film and the preparation process into consideration. In the case where the sheet is subjected to the plasma treatment after incomplete drawing, the incomplete drawing may be carried out to any desired extent, although the plasma treatment must be carried out before completion of the biaxial drawing. It is ordinarily preferred that the sheet be subjected to the plasma treatment in the undrawn or monoaxially drawn state. From the results of experiments made by us, it has been confirmed that, in the case of a crystalline polymeric resin, when the low temperature plasma treatment is carried out in the stage where the crystallization the surface modifying effect is conspicuous, when the sheet having a rather low degree of crystallization is subjected to the plasma treatment. For example, in the case of a polyethylene terephthalate resin, it is preferred that a sheet having a crystallization degree of not larger than 50%, especially not larger than 45%, be subjected to the plasma treatment.

The surface of the film to be subjected to the plasma treatment is not particularly critical, and the surface to be treated is appropriately selected according to the intended use of the film. Both surfaces of the film may be treated, or the treatment may be carried out so that edge portions remain untreated.

The sheet which has been subjected to the above-mentioned plasma treatment is drawn in at least one direction to form a completely biaxially stretched film. The drawing method and conditions are not particularly critical, and drawing may be carried out according to a method suitable for the sheet. For example, in the case of a polyethylene terephthalate resin, if a sequential biaxial drawing method is adopted in which the sheet is first drawn in the longitudinal direction at 75° C. to 110° C. at a draw ratio of 2 to 4 and is then drawn in the lateral direction at 90° C. to 125° C. at a draw ratio of 3 to 6, a polyethylene terephthalate film having excellent mechanical strengths can be obtained. If this biaxially drawn film is further drawn at 120° C. to 165° C. at a draw ratio of 1.2 to 2.0 in the longitudinal direction and at a draw ratio of 1.1 to 1.5 in the lateral direction, the mechanical strength of the film is further enhanced. If drawing in the longitudinal direction is carried out before the low temperature plasma treatment, drawing only in the lateral direction may be carried out.

In the case of the simultaneous biaxial drawing method, the sheet is drawn at 75° C. to 110° C. at a draw ratio of 1.5 to 4.0 in each direction at an area draw ratio of 6 to 25.

Ordinarily, if a polymeric resin film is heat-treated after drawing, the thermal stability of various characteristics is improved. Also, in the preparation process of the present invention, it is preferred that the heat treatment be carried out after drawing. The heat treatment method and conditions are not particularly critical, and a method suitable for the film is selected. For example, in the case of a polyethylene terephthalate film, if the heat treatment is carried out at 180° C. to 235° C., an excellent film having a small thermal shrinkage coefficient can be obtained.

The biaxially stretched polyester film of the present invention has a multiplicity of osmic acid-dyeable ultrafine protrusions on the surface, the protrusions are arranged in a certain direction, and the surface having a chemical composition such that the $O_{1s}/C_{1s}$ ratio is 50 to 95% of the $O_{1s}/C_{1s}$ ratio of the base polymer. By dint of these characteristic features, the film has a good slip characteristic even though the surface is smooth, and furthermore, the film has an excellent bondability. It is not clear what function is exerted by the osmic acid dyeability. However, in view of the fact that if a polymeric film is surface-modified, the film becomes dyeable with osmic acid, it is believed that the surface undergoes a surface modification, and by the formation of protrusions, the easy slip characteristic is manifested. Moreover, it is considered that if the modified surface has a chemical composition such that the $O_{1s}/C_{1s}$ ratio is within the above range, the stability of the bondability with the lapse of time is improved.

A process is known in which the bondability is improved by subjecting a film to a corona discharge treatment or plasma treatment. According to this process, however, osmic acid-dyeable protrusions such as those possessed by the film of the present invention cannot be formed, and as is well known, the bonding characteristics are degraded with the lapse of time. Although the modifying effect is lost in a film subjected to the corona discharge treatment or plasma treatment in the ordinary film state if it is exposed to a temperature higher than the glass transition temperature, the film of the present invention has the characteristic that, even if the film of the present invention is exposed to a temperature much higher than the glass transition temperature at the heat treatment step, a high bondability improvement effect can be attained.

The film-preparing process of the present invention is advantageous from the industrial viewpoint. More specifically, the plasma treatment is carried out at the stage where the sheet has a narrow width and is delivered at a low speed, and the treated area is expanded by the subsequent drawing. The cost of the plasma treatment per unit area is reduced by the ratio of expansion of the area by the drawing, as compared with the treatment cost in the conventional process in which the plasma treatment is conducted at the stage of the drawn film. Accordingly, the manufacturing cost is low in the process of the present invention.

The biaxially stretched polyester film of the present invention is superior to conventional polyester films in bondability, in that reduction of the bondability with the lapse of time is extremely small. Moreover, the biaxially stretched polyester film of the present invention has a smooth surface giving an excellent slip characteristic.

Accordingly, the polyester film of the present invention is excellent as a film for electric parts such as a capacitor, a magnetic recording film of a magnetic tape or floppy disc, a photographic base film of a diazo film or silver salt photographic film, and a base film for graphic art such as a peel film In the present invention, the surface characteristics of films are determined and evaluated according to the following methods.

(1) Bondability
(1)-A Adhesion to Vacuum-Deposited Aluminum

Al was vacuum-deposited in a thickness of about 100 nm under a vacuum of about $1 \times 10^{-5}$ mmHg by using a bell-jar type high vacuum deposition apparatus (Model EBH-6 supplied by ULVAC Corporation). A commercially available adhesive cellophane tape (supplied by Nichiban Co., Ltd.) was applied to the Al-vacuum-deposited surface and the tape was peeled at an angle of 90°. The adhesion was evaluated based on the ratio of the residual Al-adhering area according to the following scale:

| Residual Al—Adhering Area Ratio (%) | Vacuum Deposition Index |
| --- | --- |
| 100% | 5 |
| Lower than 100% but not lower than 90% | 4 |
| Lower than 90% but not lower than 75% | 3 |
| Lower than 75% but not lower than 50% | 2 |
| Lower than 50% | 1 |

If the index is 3 or larger, the bondability is practically acceptable.

(1)-B Adhesion to Magnetic Coating

The following magnetic lacquer was coated on a sample and a commercially available adhesive cellophane tape (supplied by Nichiban Co., Ltd.) was applied to the coated surface. The tape was peeled at an angle of 90° and the adhesion was evaluated based on the ratio of the residual magnetic coating-adhering area according to the same 5-scale index method as adopted for the evaluation of the adhesion to vacuum-deposited aluminum.

| Magnetic Lacquer | |
| --- | --- |
| Ferromagnetic alloy powder (Fe—Co) | 300 parts by weight |
| Zinc powder (having average particle size of 2 μm) | 25 parts by weight |
| Cellulose acetate butyrate | 30 parts by weight |
| Polyisocyanate compound (Desmodur L-75) | 180 parts by weight |
| Epoxy resin | 25 parts by weight |
| Silicone oil | 4 parts by weight |
| Lecithin | 5 parts by weight |
| Toluene (solvent) | 200 parts by weight |
| Methyl ethyl ketone (solvent) | 200 parts by weight |
| Ethyl acetate (solvent) | 100 parts by weight |

(1)-C Adhesion to Printing Ink

A printing ink for cellophane (CC-ST White supplied by Toyo Ink Mfg. Co.) was coated on a film by using a metering bar so that the amount of coated ink was about 3 g/m$_2$ as solids, and the coated film was dried with hot air at 60° C. for 1 minute. In the same manner as described above with reference to the adhesion to vacuum-deposited aluminum, the adhesive cellophane tape peel test was carried out and the adhesion to the printing ink was evaluated according to the 5-scale index method.

(2) Change of Bondability with Lapse of Time

A film was allowed to stand in an atmosphere maintained at a temperature of 50° C. and a relative humidity of 83% for 3 months, and the above-mentioned bondability tests were carried out.

(3) Slip Characteristic

The static frictional coefficient ($\mu s$) between the polyester films was measured by using a slip tester according to ASTM D-1894B-63.

(4) Surface Roughness Ra (μm)

The surface roughness was measured by using a feeler type surface roughness measurement system (Model ET-10 supplied by Kosaka Laboratory Ltd.) according to JIS B-0601 (cut-off value =0.25 mm, measurement length =4 mm).

(5) ESCA Measurement Method

The carbon 1s orbit ($C_{1s}$) spectrum and oxygen 1s orbit ($O_{1s}$) spectrum on the film surface were determined by an ESCA spectrometer (Model ES-2000 supplied by Kokusai Electric Co., Ltd.), and the ratio between the integration intensities of the respective peaks was calculated. At the measurement, the sample was set so that the photoelectron emission angle was 20°. Since the sample surface was contaminated, before the measurement the sample was washed with aceton under ultrasonic vibration for 30 minutes and then washed with n-heptane and Freon, respectively, for 30 minutes under ultrasonic vibration. Then, the sample was further washed with flurocarbon vapor and then isopropyl alcohol vapor, respectively, for 30 minutes, whereby contaminants on the film surface were completely removed.

(6) Determination of Infrared Absorption Spectrum

An ATR accessory device (supplied by Wilks, Inc., USA) was attached to an FTS-20 (supplied by Digilab, Inc., USA), and the measurement was carried out at a reflection angle of 60° by using KRS5 as the medium having a high refractive index. Before the measurement, the sample was washed in the same manner as described in (5) above.

(7) Observation of Section and Surface

The section of an ultrathin slice of the surface layer portion of a film was observed according to the osmic acid dyeing method using a transmission electron microscope (Model H-600 supplied by Hitachi Ltd.). The magnifying power adopted for the observation was 100,000 magnifications.

The surface was observed at 30,000 magnifications by using a scanning electron microscope of the electric field emission type (Model S-800 supplied by Hitachi Ltd.).

(8) Observation of Surface by Differential Interface Microscope

Aluminum was vacuum-deposited on the surface of a film, and the deposited surface was observed at 2,500 magnifications by a differential interference microscope (OPTIPHOTO supplied by Nippon Kogaku K.K.).

The present invention will now be described in detail with reference to the following examples.

EXAMPLES 1 THROUGH 5

Dimethyl terephthalate and ethylene glycol were subjected to ester exchange reaction and polycondensation according to customary procedures to prepare a polyethylene terephthalate resin free of internal particles and exterior particles.

The resin was melt-extruded at 285° C. and cast on a cooling drum maintained at 60° C. to obtain an undrawn sheet. The sheet was subjected to a plasma treatment in Ar gas. More specifically, both surfaces were treated by feeding the sheet to rod electrodes, to which a high voltage was imposed, in a plasma device of the internal electrode type having a pair of ground electrodes, under an Ar gas pressure of 0.01 Torr at a high-frequency power source frequency of 110 KHz and a primary voltage of 4 KV. The sheet feed speed was 4, 7, 10, 13 or 16 m/min.

According to the conventional sequential biaxial drawing method, the treated sheet was drawn in the longitudinal direction at a draw ratio of 3.3 at 90° C. between a pair of rolls differing in the peripheral speed, and the sheet was then fed into a tenter and drawn in the lateral direction at a draw ratio of 3.5 at 95° C. while being held at both ends by clips. Then, in the tenter, the sheet was relaxed by 5% in the lateral direction and heat-treated at 218° C. for 5 seconds to obtain a biaxially stretched polyethylene terephthalate film having a thickness of 15 μm. All the preparation steps inclusive of the plasma treatment were consistently conducted in a continuous manner. The winding property of the thus-obtained film was very good.

For each of the thus-obtained films, an infrared absorption spectrum analysis and ESCA measurement were carried out, the section and surface were observed by an electron microscope, and the surface was observed by a differential interference microscope.

In connection with the infrared absorption spectrum, each sample was not substantially different from a film prepared without performing the plasma treatment (Comparative Example 1). The $O_{1s}/C_{1s}$ ratios of the respective samples and the film of Comparative Example 1, which were obtained at the ESCA measurement, are shown in Table 1.

Figure 5:
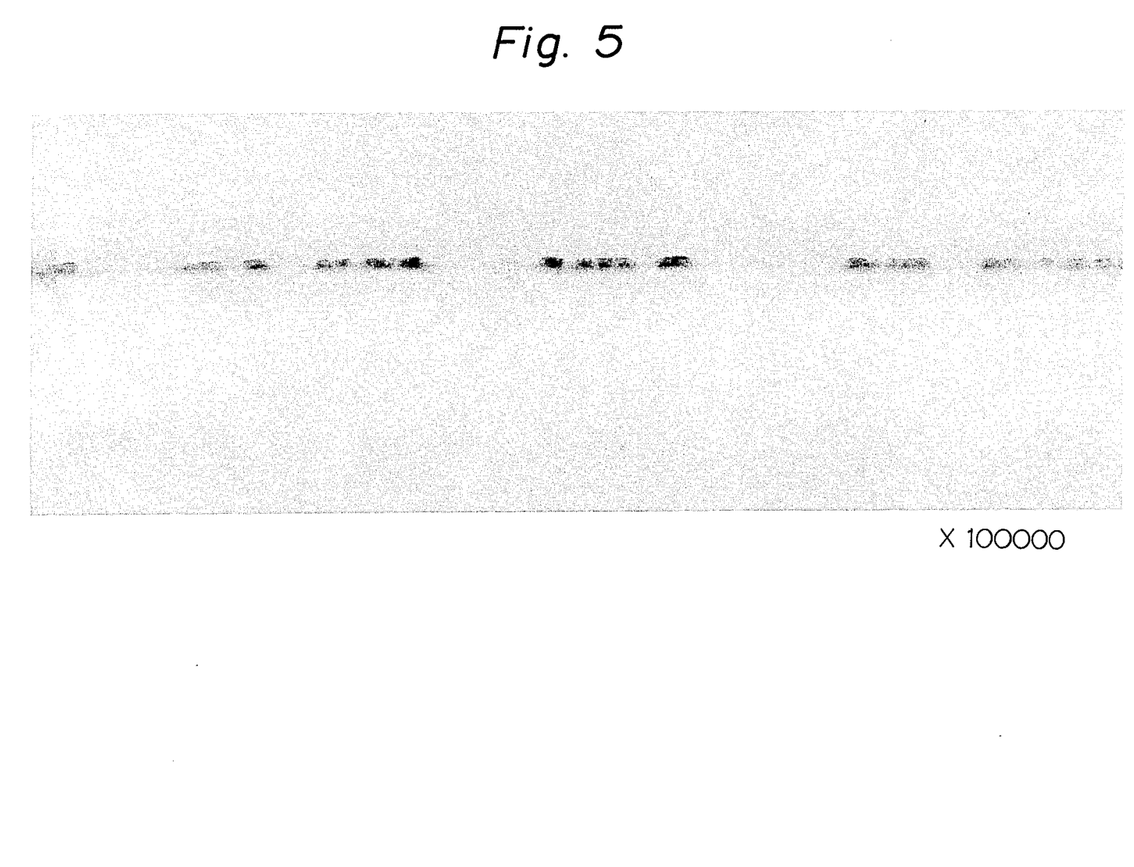
FIG. 5 is a microscope photograph of the section of the film prepared in Example 3.

In each sample, by observation of the surface, it was confirmed that protrusions dyeable with osmic acid were present. The photograph of the section of the film obtained by carrying out the plasma treatment at a sheet speed of 10 m/min (Example 3) is shown in FIG. 5. Other films had sections having patterns similar to that shown in FIG. 5. The pattern obtained at a higher plasma treatment speed was as shown in FIG. 10(a) and the pattern obtained at a lower plasma treatment speed was as shown in FIG. 1-(b) The maximum heights of the osmic acid-dyeable protrusions of the respective films are shown in Table 1.

Figure 6:
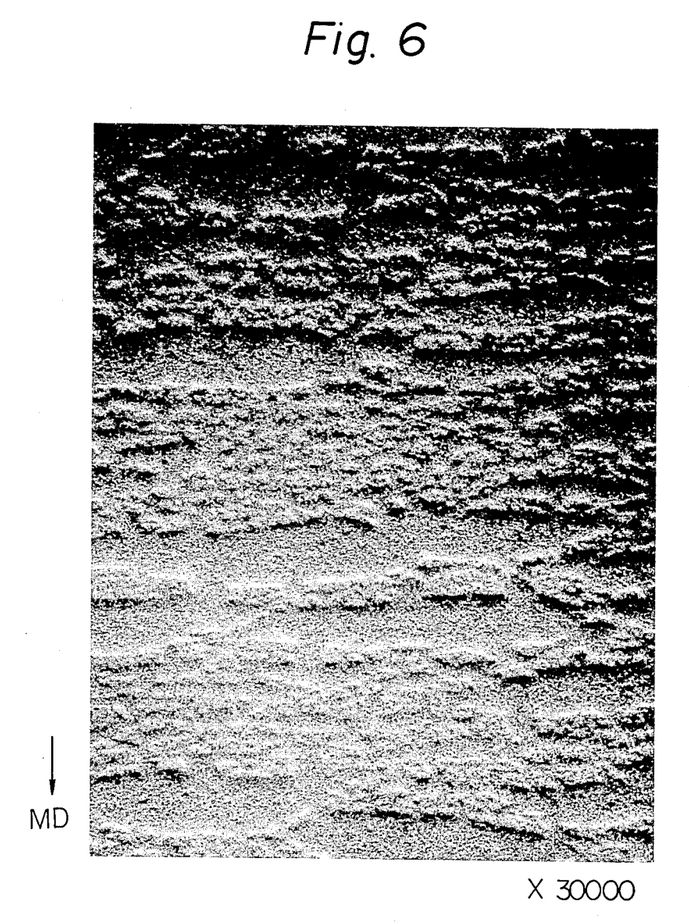
FIG. 6 is a microscope photograph of the surface of the film prepared in Example 3.
Figure 7:
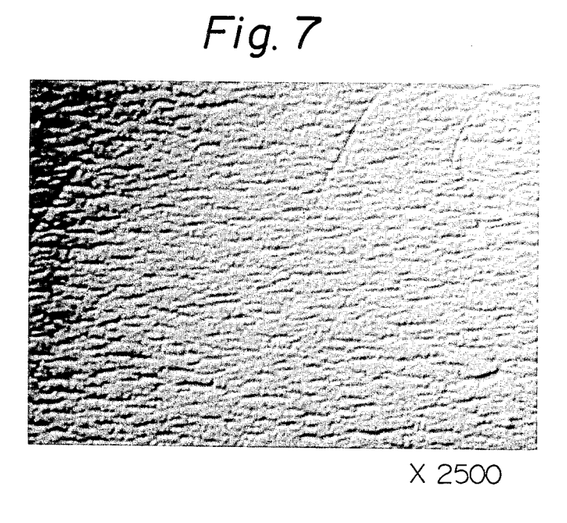
FIG. 7 is a differential interference microscope of the surface of the film prepared in Example 3; and, FIG. 8 is a differential interference microscope of the surface of the film prepared in Example 2.
Figure 8:
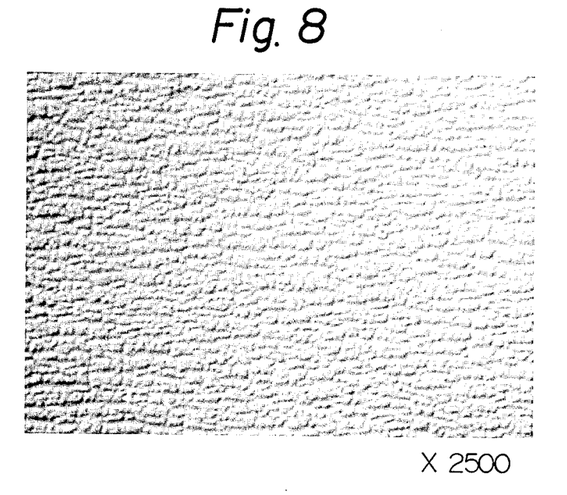

When the respective films were observed by an electron microscope, it was found that the protrusions were substantially uniformly arranged so that the angle of the major axis of the protrusions was about 90° to the longitudinal direction of the film. The photograph of the surface of the film of Example 3 is shown in FIG. 6. When the surface of the film of Example 3 was observed by a differential interference microscope, it was found that linear dents extended substantially rectangularly to the longitudinal direction of the film, as shown in the photograph of FIG. 7. Furthermore, in the case of the film obtained at a plasma treatment speed of 7 m/min (Example 2), it was found that long protrusions were arranged substantially rectangularly to the longitudinal direction of the film, as shown in the photograph of FIG. 8.

The bondability, slip characteristic and surface roughness of each film were determined, and the obtained results are as shown in Table 1.

As shown in Table 1, each of the films of Examples 1 through 5 was superior to the film of Comparative Example 1 in bondability and slip characteristics. If the height of the protrusions was smaller than 100 angstroms, the slip characteristic was relatively poor. If the height of the protrusions was larger than 300 angstroms, the surface roughness was somewhat increased.

COMPARATIVE EXAMPLES 1 AND 2

A biaxially stretched polyethylene terephthalate film was prepared in the same manner as described in Example 1 except that the plasma treatment was not carried out (Comparative Example 1), or the corona discharge treatment was carried out in the open air at an energy density of 50 W·min/m₂ instead of the plasma treatment (Comparative Example 2).

These films did not slip, and at the final winding step, they were wrinkled and could not be wound. Accordingly, small quantities of samples were collected before the winding step and were evaluated.

When the sections and surfaces of these films were observed by an electron microscope, the formation of osmic acid-dyeable protrusions could not be found at all.

The bondability, slip characteristic and surface roughness of each of these samples were determined, and the obtained results are as shown in Table 1. These films had a very smooth surface, but the slip characteristic and bondability were poor.

COMPARATIVE EXAMPLE 3

A small quantity of the film sampled in Comparative Example 1 was subjected to a plasma treatment under the same conditions as described in Example 3.

When the section and surface of the treated film were observed by an electron microscope, it was found that an osmic acid-dyeable layer was formed in the surface portion but protrusions were not formed at all.

The results of the evaluation of the treated film are shown in Table 1. Although the value of the slip characteristic of the film was the same as the value of the films of Comparative Examples 1 and 2, when these films were caused to slip by the hand, the film slipped more smoothly than the films of Comparative Examples 1 and 2. However, in the slip characteristic of the film was inferior to that of the films of Examples 1 through 5.

film had a smooth surface and an excellent slip characteristic.

When the section of the film was observed by an electron microscope, it was confirmed that protrusions dyeable with osmic acid were formed.

EXAMPLE 7

The plasma treatment was carried out by using a mixed gas of trimethylchlorosilane [$(CH_3)_3SiCl$] and argon instead of the argon gas used in Example 6. The Ar/trimethylchlorosilane molar ratio was 70/30, the gas pressure was 0.002 Torr, and the primary voltage was 2.5 KV. The other conditions were the same as in Example 6.

The obtained film had a good slip characteristic, as shown in Table 2.

TABLE 2

| Example No. | Surface roughness Ra ($\mu m$) | Slip characteristic ($\mu s$) |
| --- | --- | --- |
| 6 | 0.0010 | 0.78 |
| 7 | 0.0009 | 0.62 |

TABLE 1

| | Plasma treatment speed (m/min) | Maximum height of Protrusions (angstroms) | Surface roughness Ra ($\mu m$) | Slip characteristic ($\mu s$) | $O_{1s}/C_{1s}$ Ratio (%) | Bondability | | | Bondability after lapse of time | | |
| --- | --- | --- | --- | --- | --- | --- | --- | --- | --- | --- | --- |
| | | | | | | Adhesion to vacuum-deposited Al | Adhesion to magnetic coating | Adhesion to printing ink | Adhesion to vacuum-deposited Al | Adhesion to magnetic coating | Adhesion to printing ink |
| Example 1 | 4 | 350 | 0.0020 | 0.62 | 65 | 3–4 | 3–4 | 3–4 | 3 | 3 | 3 |
| Example 2 | 7 | 200 | 0.0010 | 0.89 | 78 | 5 | 5 | 5 | 5 | 5 | 5 |
| Example 3 | 10 | 150 | 0.0009 | 1.2 | 84 | 5 | 5 | 5 | 5 | 5 | 5 |
| Example 4 | 13 | 100 | 0.0008 | 2.0 | 87 | 5 | 5 | 5 | 5 | 5 | 5 |
| Example 5 | 16 | 70 | 0.0007 | 3.2 | 90 | 5 | 5 | 5 | 5 | 5 | 5 |
| Comparative Example 1 | — | — | 0.0004 | Above 4 | 100 | 1 | 1 | 1 | 1 | 1 | 1 |
| Comparative Example 2 | — | — | 0.0004 | Above 4 | 100 | 1 | 1 | 1 | 1 | 1 | 1 |
| Comparative Example 3 | — | — | 0.0004 | 4 | 120 | 5 | 5 | 5 | 3 | 2 | 3 |

EXAMPLE 6

Dimethyl terephthalate and ethylene glycol were subjected to ester exchange reaction and then polycondensation according to customary procedures. Colloidal silica having an average particle size of 450 nm was added in an amount of 0.2% by weight to the formed polyethylene terephthalate resin.

The resin was melt-extruded at 285° C. and cast on a cooling drum maintained at 60° C. to obtain an undrawn sheet. One surface of the sheet was subjected to the plasma treatment in argon gas. By using the same apparatus as used in Example 1, the plasma treatment was carried out under the same conditions as described in Example 1 except that the gas pressure was changed to 0.1 Torr, the primary voltage was changed to 7 KV, and the sheet speed was adjusted to 15 m/min.

The treated sheet was subjected to the sequential biaxial drawing in the same manner as described in Example 1 to obtain a biaxially stretched polyester film having a thickness of 15 $\mu m$. All of the preparation steps inclusive of the plasma treatment were successively conducted in a continuous manner.

The winding property of the obtained film was very good. The slip characteristic and surface roughness were determined, and the obtained results are as shown in Table 2. As seen from the data shown in Table 2, the

EXAMPLE 8

The polyethylene terephthalate resin used in Example 6 was melt-extruded at 285° C. and cast on a cooling drum maintained at 60° C. to obtain an undrawn sheet. The sheet was drawn in the longitudinal direction at 90° C. at a draw ratio of 3.3 between a pair of rolls differing in the peripheral speed to give the sheet having a crystallization degree of 24%. One surface of the drawn sheet was subjected to the plasma treatment in the same manner and under the same conditions as described in Example 6. The treated sheet was then fed into a tenter and drawn at 95° C. in the lateral direction (width direction) at a draw ratio of 3.5, while being gripped at both ends by clips. Then, in the tenter, the sheet was relaxed by 5% in the lateral direction and heat-treated at 218° C. to obtain a biaxially stretched polyethylene terephthalate film having a thickness of 15 $\mu m$.

When the film was observed by an electron microscope, it was found that osmic acid-dyeable protrusions were formed in parallel to the longitudinal direction of the film.

It was found that the surface roughness Ra of the film was 0.008 $\mu m$ and the slip characteristic was 1.5 $\mu s$. Thus, it was confirmed that the film had a smooth surface and had an excellent slip characteristic.

EXAMPLE 9

Dimethyl terephthalate and ethylene glycol were subjected to ester exchange reaction and then polycondensation according to customary procedures to obtain a polyethylene terephthalate resin containing fine particles formed by precipitation of a part of the catalyst during the reaction (0.3% by weight of internal particles). The resin was melt-extruded at 285° C. and cast on a cooling drum maintained at 60° C. to form an undrawn sheet. The sheet was subjected to the plasma treatment in argon gas. More specifically, the sheet was fed to rod electrodes to which a high voltage was imposed, and a low temperature plasma device of the internal electrode type having a pair of ground electrodes was used and one surface of the sheet was treated under an argon gas pressure of 0.4 Torr at a high-frequency power source frequency of 110 KHz, a primary voltage of 5 KV, and a sheet speed of 15 m/min.

According to the customary sequential biaxial drawing method, the sheet was drawn in the longitudinal direction at 90° C. at a draw ratio of 3.3 by a pair of rolls differing in the peripheral speed, and the sheet was fed into a tenter and drawn in the lateral direction at 95° C. at a draw ratio of 3.5 while being gripped at both ends by clips. In the tenter, the drawn film was relaxed by 5% in the lateral direction and heat-treated at 218° C. for 5 seconds to obtain a biaxially stretched polyethylene terephthalate film having a thickness of 15 μm.

It was found that protrusions dyeable with osmic acid were formed on the surface of the film.

The bondability of the film and the change of the bondability with the lapse of time were evaluated. The obtained results are shown in Table 3. From these results, it is seen that the film of the present invention has an excellent bondability (i.e., adhesion to vacuum-deposited Al, adhesion to the magnetic coating, and adhesion to the printing ink) and the resistance to degradation of the bondability with the lapse of time is high.

EXAMPLES 10 THROUGH 15

Biaxially stretched polyethylene terephthalate films were prepared in the same manner as described in Example 9 except that $N_2$, $CO_2$, CO, $N_2O$, $NH_3$, or air was used instead of the Ar gas for the plasma treatment. The other film-preparing conditions were the same as in Example 9.

On the surface of each film, protrusions dyeable with osmic acid were formed.

With respect to each film, the bondability and the change of the bondability with the lapse of time were determined. The obtained results are shown in Table 3. As shown in Table 3, each of the films obtained according to the present invention had an excellent bondability and a high resistance to degradation of the bondability with the lapse of time.

COMPARATIVE EXAMPLES 4 THROUGH 10

According to customary procedures, a polyethylene terephthalate film having a thickness of 15 μm was prepared without performing the plasma treatment of Example 9 at the sheet stage.

The obtained film was then subjected to the plasma treatment in Ar, $N_2$, $CO_2$, CO, $N_2O$, $NH_3$ or air under the same conditions as described in Example 9.

Examples 9 through 15 were different from Comparative Examples 4 through 10 only in that the sheet was subjected to the plasma treatment in the Examples while the film was subjected to the plasma treatment in the Comparative Examples. The other preparation conditions were the same between the Examples and the Comparative Examples.

When the surfaces and sections of the obtained films were observed by an electron microscope, it was found that osmic acid-dyeable layers were formed but protrusions were not formed at all.

The bondability and the change of the bondability with the lapse of time of each film were determined, and the obtained resulted are as shown in Table 3. As shown in Table 3, these films had an excellent initial bondability, but this bondability was drastically degraded with the lapse of time.

COMPARATIVE EXAMPLE 11

The non-stretched sheet prepared in the same manner as described in Example 9 was subjected to a corona discharge treatment at an energy density of 50 W·min/m² and was then drawn by the same biaxial sequential drawing method as described in Example 9 to obtain a biaxially stretched film having a thickness of 15 μm.

The results of the evaluation of the bondability of the film are shown in Table 3. As seen from the results shown in Table 3, no substantial improvement of the bondability could be attained by the method of this Comparative Example.

COMPARATIVE EXAMPLE 12

A polyethylene terephthalate film having a thickness of 15 μm was prepared according to the conventional process as described in Comparative Example 4, wherein the film was subjected to a corona discharge treatment at an energy density of 50 W·min/m² instead of the argon plasma treatment.

The results of the evaluation of the bondability of the treated film are shown in Table 3. As seen from the results shown in Table 3, a certain improvement of the bondability was attained but the improvement was not satisfactory, and this improvement effect completely disappeared with the lapse of time.

TABLE 3

| | Plasma gas | Bondability | | | Bondability after lapse of time | | |
|---|---|---|---|---|---|---|---|
| | | Adhesion to vacuum-deposited Al | Adhesion to magnetic coating | Adhesion to printing ink | Adhesion to vacuum-deposited Al | Adhesion to magnetic coating | Adhesion to printing ink |
| Example 9 | Ar | 5 | 5 | 5 | 5 | 5 | 5 |
| Example 10 | $N_2$ | 5 | 5 | 5 | 5 | 4 | 5 |
| Example 11 | $CO_2$ | 5 | 5 | 5 | 5 | 4 | 5 |
| Example 12 | CO | 5 | 5 | 5 | 5 | 4 | 5 |
| Example 13 | $N_2O$ | 5 | 5 | 5 | 5 | 4 | 5 |
| Example 14 | $NH_3$ | 5 | 4 | 5 | 5 | 4 | 5 |
| Example 15 | Air | 5 | 4 | 5 | 5 | 4 | 5 |

TABLE 3-continued

| | Plasma gas | Bondability | | | Bondability after lapse of time | | |
|---|---|---|---|---|---|---|---|
| | | Adhesion to vacuum-deposited Al | Adhesion to magnetic coating | Adhesion to printing ink | Adhesion to vacuum-deposited Al | Adhesion to magnetic coating | Adhesion to printing ink |
| Comparative Example 4 | Ar | 5 | 5 | 5 | 4 | 2 | 3 |
| Comparative Example 5 | $N_2$ | 5 | 5 | 5 | 3 | 2 | 2 |
| Comparative Example 6 | $CO_2$ | 5 | 5 | 5 | 3 | 2 | 2 |
| Comparative Example 7 | CO | 5 | 5 | 5 | 4 | 2 | 3 |
| Comparative Example 8 | $N_2O$ | 5 | 5 | 5 | 3 | 2 | 2 |
| Comparative Example 9 | $NH_3$ | 5 | 5 | 5 | 2 | 2 | 1 |
| Comparative Example 10 | Air | 5 | 5 | 5 | 2 | 1 | 1 |
| Comparative Example 11 | — | 3 | 1 | 1 | 2 | 1 | 1 |
| Comparative Example 12 | — | 4 | 2 | 2 | 2 | 1 | 1 |

We claim:

1. A biaxially stretched polyester film having a multiplicity of elongated and directionally arranged ultra-fine protrusions on the surface thereof, wherein said protrusions have a height of 50 to 300 angstroms and a width of 100 to 300 angstroms and 1 to 20 protrusions are present per $\mu$m of the surface length as observed on a cross-section perpendicular to the direction of the arrangement of the protrusions, said protrusions being an integral part of the polyester film and tightly adherent thereto and being dyeable with osmic acid, and said film having a static friction coefficient ($\mu s$) of 0.3 to 3.0.

2. A biaxially stretched polyester film as set forth in claim 1, wherein at least 50% by number of the protrusions are arranged so that the major axis thereof are within $\pm 30°$ relative to the longitudinal or lateral direction of the film.

3. A biaxially stretched polyester film as set forth in claim 1, wherein 10 to 50 of the osmic acid-dyeable protrusions having a height of 50 to 300 angstroms, a width of 100 to 3000 angstroms and a length of 100 angstroms to 2 $\mu$m are present per $\mu m^2$ of the surface of the film.

4. A biaxially stretched polyester film as set forth in claim 1, which has a surface roughness (Ra) of 0.0005 to 0.0100 $\mu$m.

5. A biaxially stretched polyester film as set forth in claim 4, which has a surface roughness (Ra) of 0.001 to 0.005 $\mu$m and a static friction coefficient ($\mu s$) of 0.5 to 2.0.

6. A biaxially stretched polyester film as set forth in claim 1, wherein when the surface having the osmic acid-dyeable ultra-fine protrusions is analyzed by an X-ray photoelectron spectroscopic analysis device so that the photoelectron emission angle is 20° to the sample, the ratio $O_{1s}/C_{1s}$ of the integration intensity $O_{1s}$ of the oxygen atom to the integration intensity $C_{1s}$ of the carbon atom in the surface having said protrusions is 50 to 95% of the ratio $O_{1s}/C_{1s}$ of the polyester polymer as the base.

7. A biaxially stretched polyester film as set forth in claim 6, wherein the ratio $O_{1s}/C_{1s}$ of the surface having said protrusions is 70 to 90% of the ratio $O_{1s}/C_{1s}$ of the polyester polymer as the base.

8. A magnetic recording medium comprising a magnetic layer laminted at least on a part of biaxially stretched polyester film having a multiplicity of elongated and directionally arranged ultra-fine protrusions on the surface thereof, wherein said protrusions have a height of 50 to 300 angstroms and a width of 100 to 3000 angstroms and 1 to 20 protrusions are present per m of the surface length as observed on a cross-section perpendicular to the direction of the arrangement of the protrusions, said protrusions being an integral part of the polyester film and tightly adherent thereto and being dyeable with osmic acid, and said film having a static friction coefficient ($\mu s$) of 0.3 to 3.0.

9. A magnetic recording medium as set forth in claim 8, wherein the magnetic layer has a multiplicity of protrusions on the outer surface thereof and at least 50% by number of the protrusions are arranged so that the major axis thereof are within $\pm 30°$ relative to in the longitudinal or lateral direction of the magnetic recording medium.

10. A magnetic recording medium as set forth in claim 8, wherein 10 to 50 of the protrusions having a height of 50 to 300 angstroms, a width of 100 to 3000 angstroms and a length of 100 angstroms to 2 $\mu$m are present per $\mu m^2$ of the outer surface of the magnetic layer.

11. A process for the preparation of a biaxially stretched polyester film as set forth in claim 1, which comprises subjecting a non-stretched or incompletely stretched polyester sheet to a plasma treatment and then drawing the treated sheet in at least one direction to complete the biaxial drawing.

12. A process for the preparation of a biaxially stretched polyester film according to claim 11, wherein the formation of the undrawn or drawn sheet, the plasma treatment and the subsequent drawing are successively conducted in a continuous manner.

* * * * *